United States Patent
Zaretsky et al.

(10) Patent No.: US 10,102,135 B2
(45) Date of Patent: Oct. 16, 2018

(54) DYNAMICALLY-ADJUSTED HOST MEMORY BUFFER

(71) Applicant: DELL PRODUCTS, LP, Round Rock, TX (US)

(72) Inventors: Lee B. Zaretsky, Pflugerville, TX (US); Lawrence E. Knepper, Leander, TX (US)

(73) Assignee: Dell Products, LP, Round Rock, TX (US)

(*) Notice: Subject to any disclaimer, the term of this patent is extended or adjusted under 35 U.S.C. 154(b) by 138 days.

(21) Appl. No.: 15/092,100

(22) Filed: Apr. 6, 2016

(65) Prior Publication Data

US 2017/0293562 A1    Oct. 12, 2017

(51) Int. Cl.
*G06F 12/0871* (2016.01)

(52) U.S. Cl.
CPC .. *G06F 12/0871* (2013.01); *G06F 2212/1021* (2013.01); *G06F 2212/1044* (2013.01); *G06F 2212/202* (2013.01); *G06F 2212/222* (2013.01); *G06F 2212/281* (2013.01); *G06F 2212/313* (2013.01); *G06F 2212/6046* (2013.01)

(58) Field of Classification Search
CPC .................................................. G06F 12/0871
USPC .......................................................... 711/103
See application file for complete search history.

(56) References Cited

U.S. PATENT DOCUMENTS

| 7,817,626 | B2 | 10/2010 | Nakamura et al. | |
|---|---|---|---|---|
| 2009/0228622 | A1 | 9/2009 | Pione et al. | |
| 2015/0172169 | A1 | 6/2015 | Decusatis et al. | |
| 2016/0026406 | A1* | 1/2016 | Hahn | G06F 3/0631 711/103 |
| 2017/0034064 | A1* | 2/2017 | Everhart | H04L 47/25 |

* cited by examiner

*Primary Examiner* — Gautam Sain
(74) *Attorney, Agent, or Firm* — Larson Newman, LLP

(57) ABSTRACT

Host memory buffer is dynamically adjusted based on performance. As memory pages are accessed, one or more counts of the memory pages are maintained. If the counts indicate some of the memory pages are identical, then a portion of host system memory allocated to buffer cache may be reduced or decremented in response to repetitive access. However, if the counts indicate different memory pages are accessed, then the host system memory allocated to the buffer cache may be increased or incremented.

14 Claims, 13 Drawing Sheets

DYNAMICALLY-ADJUSTED HOST MEMORY BUFFER

FIELD OF THE DISCLOSURE

The present disclosure generally relates to information handling systems, and relates more particularly to a dynamically-adjusted host memory buffer.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Host memory buffer is dynamically adjusted based on performance. As memory pages are accessed, one or more counts of the memory pages are maintained. If the counts indicate some of the memory pages are identical, then a portion of host system memory allocated to buffer cache may be reduced or decremented in response to repetitive access. However, if the counts indicate different memory pages are accessed, then the host system memory allocated to the buffer cache may be increased or incremented.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
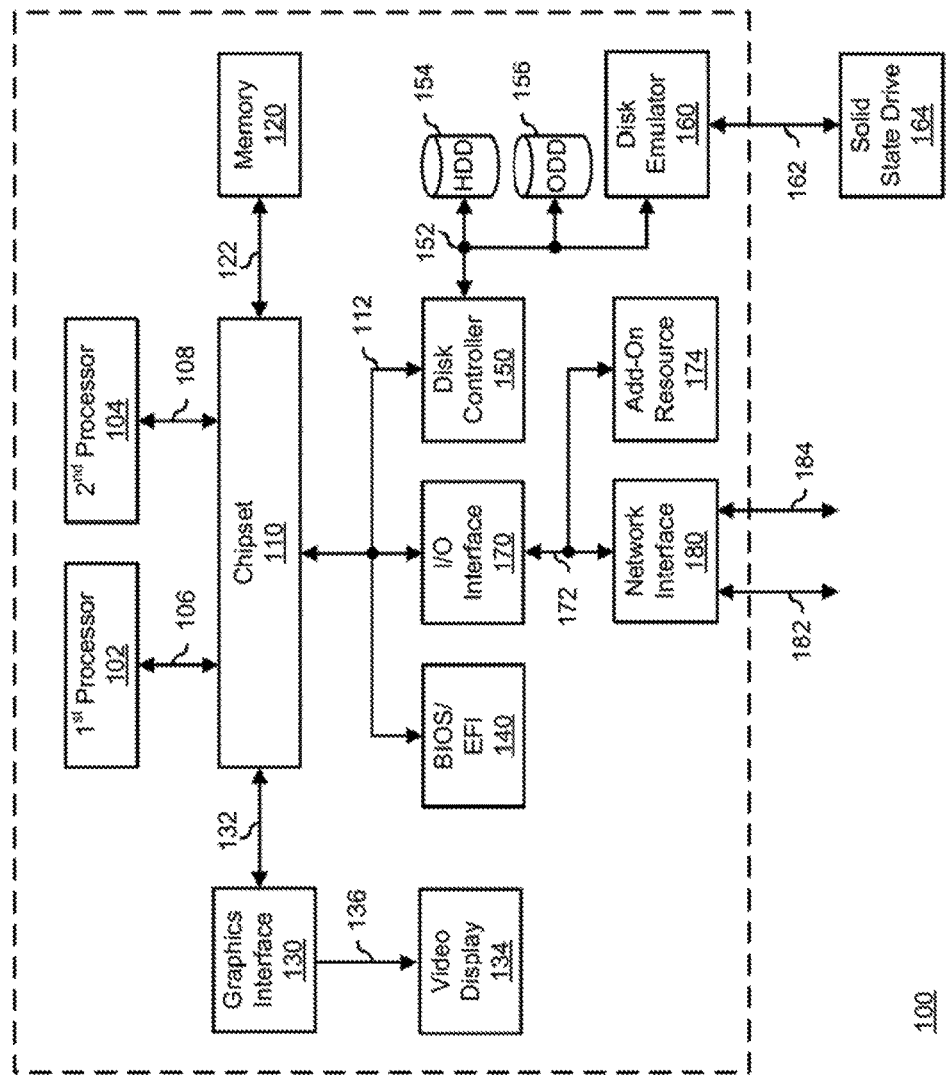
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
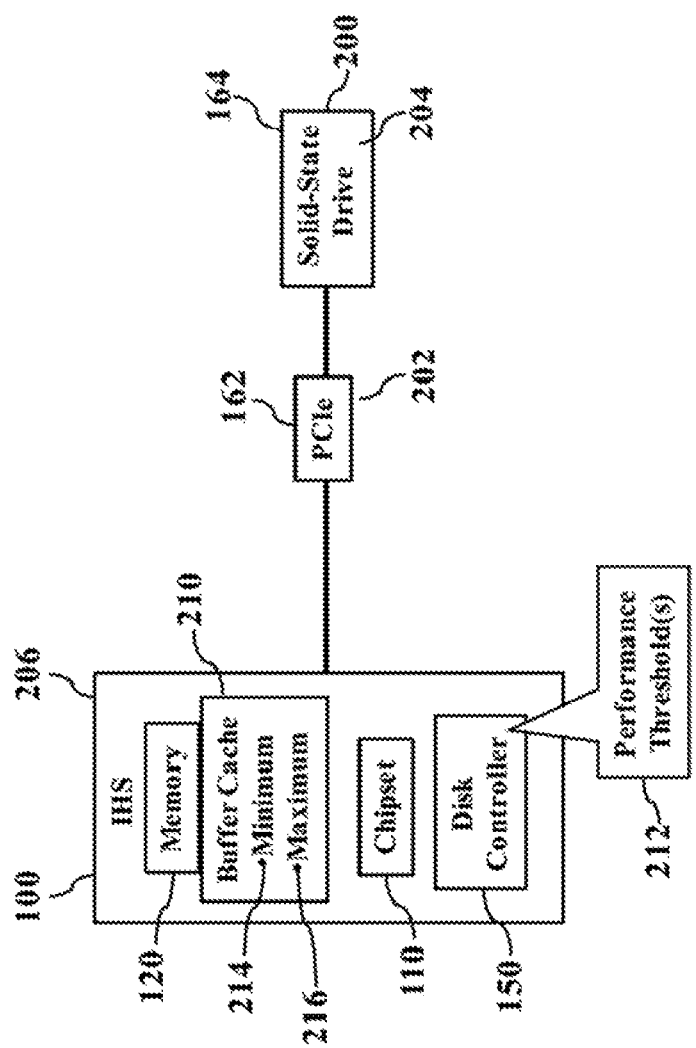
FIG. 2 further illustrates a solid-state drive, according to exemplary embodiments.

FIG. 2 further illustrates the solid-state drive 164, according to exemplary embodiments. As this disclosure previously explained, the solid-state drive 164 may be internal or external to the information handling system (IHS) 100. That is, the solid-state drive 164 may be on-chip or a chassis component, or the solid-state drive 164 may be a separate peripheral storage device connected to the information handling system 100 via the external interface 162. FIG. 2, for simplicity, illustrates the solid-state drive 164 as a peripheral device 200 to the information handling system 100. The external interface 162 is illustrated as a peripheral component interconnect express (PCIe) serial expansion bus 202. The solid-state drive 164 thus has a dedicated link or point-to-point connection with the chipset 110 (e.g., perhaps a motherboard), which is known and need not be explained in detail. The solid-state drive 164 also has internal memory 204 (such as DRAM non-volatile components), which is also generally known and need not be explained in detail.

The information handling system 100 may function as a host system 206. That is, the information handling system 100 may allocate a portion of the memory 120 as a buffering mechanism. As the disk controller 150 issues read or write instructions to the solid-state drive 164, the disk controller 150 may allocate a portion of the host memory 120 as buffer cache 210 for the exclusive use of the solid-state drive 164. The buffer cache 210 thus reduces the amount of the internal memory 204 in the solid-state drive 164 that is required for input/output operational instructions. Host memory buffering is known to reduce cost, size, and power requirements, so host memory buffering need not be explained in detail.

Here, though, exemplary embodiments may dynamically size the buffer cache 210. The solid-state drive 164 may require a relatively large amount of random access memory, perhaps even a 1:1000 ratio (that is, 1 GB of RAM for 1 TB of flash memory). Here, then, the disk controller 150 may dynamically allocate the byte amount of the buffer cache 210 based on one or more performance thresholds 212. The buffer cache 210, in other words, may have a minimum size 214 and a maximum size 216 (perhaps measured in bytes). The size of the buffer cache 210 may thus expand or contract, based on workload, usage, applications used, and other performance criterion or criteria. The byte size of the buffer cache 210, in plain words, may dynamically float or adjust (from the minimum size 214 up to the maximum size 216) according to instantaneous or overall performance expectations at any moment in time. The disk controller 150 may thus optimally size the buffer cache 210 to satisfy the performance thresholds 212 (such as minimizing buffer traffic and read/write cycles).

Figure 3:
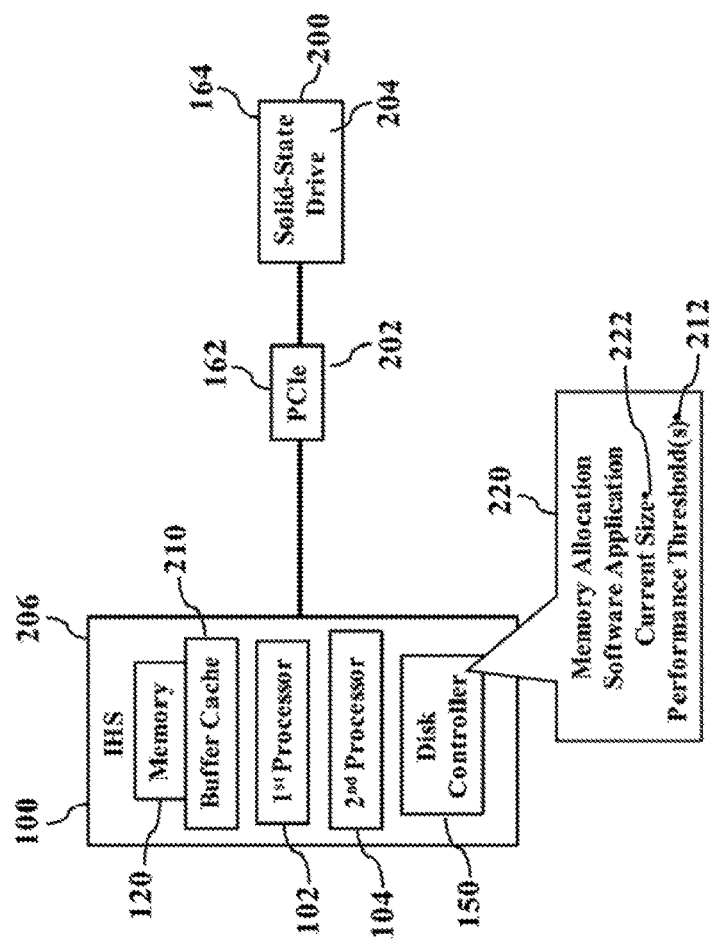
FIGS. 3-6 illustrate host memory buffering, according to exemplary embodiments.
Figure 4:
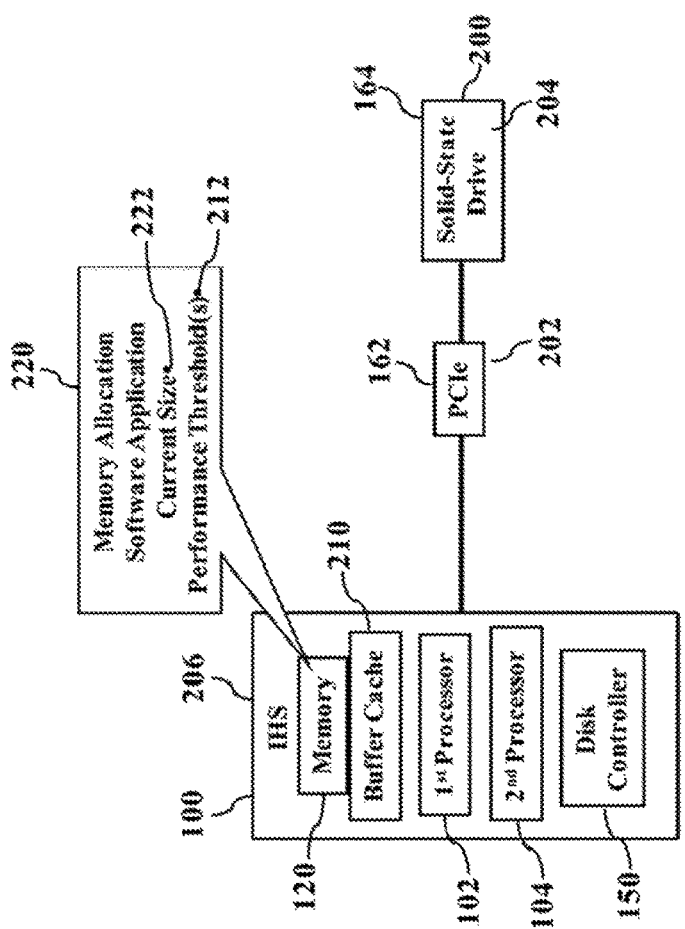
Figure 5:
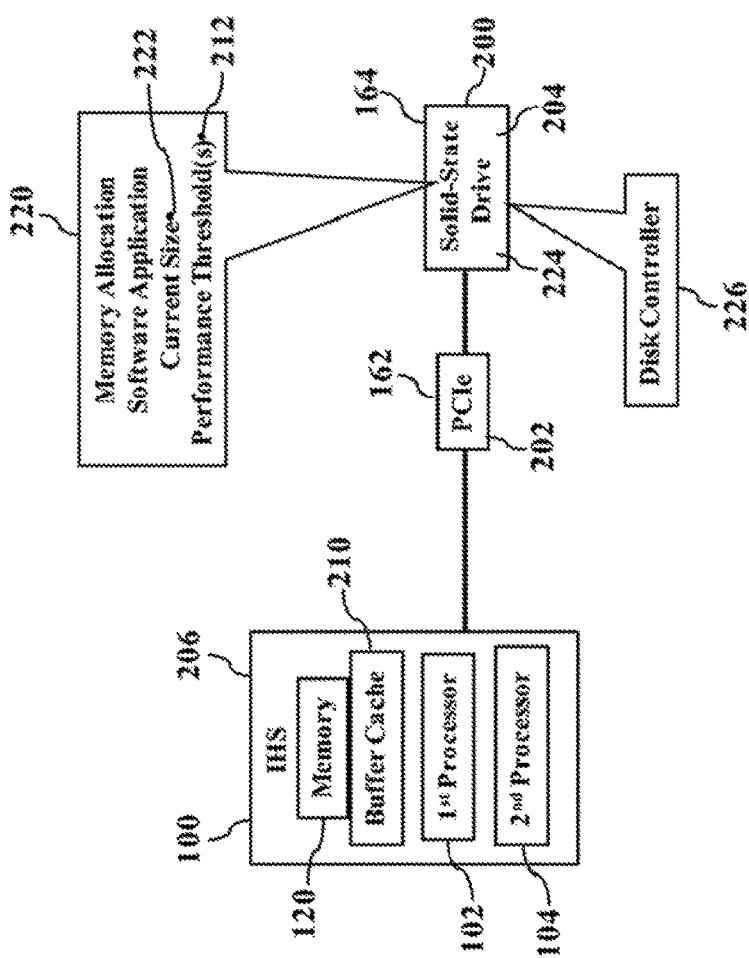
Figure 6:
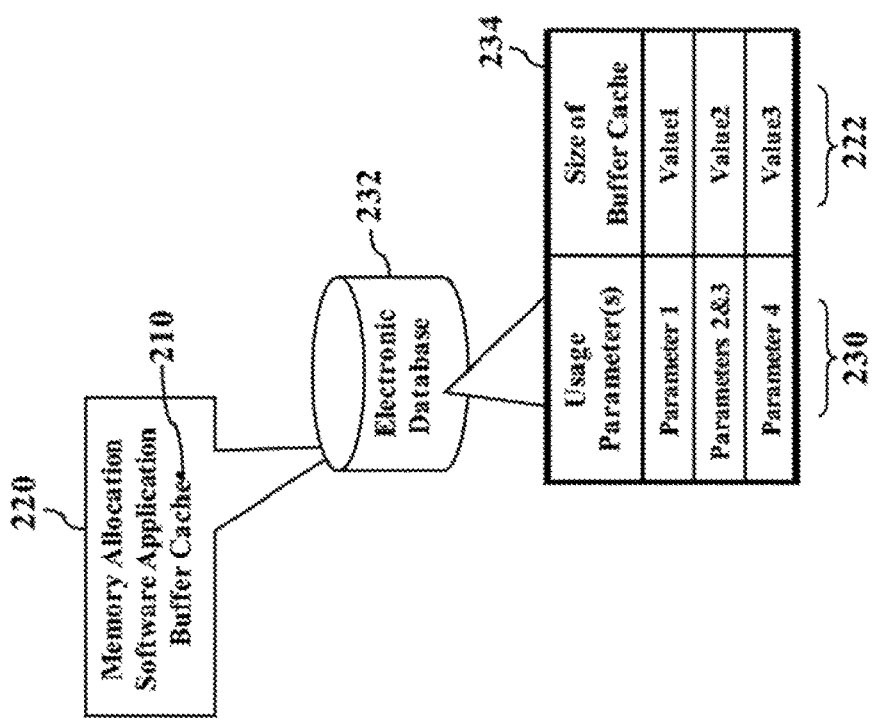

FIGS. 3-6 further illustrate host memory buffering, according to exemplary embodiments. Here a memory allocation software application 220 may determine a current size 222 of the buffer cache 210, based on the performance thresholds 212. FIG. 3 illustrates the memory allocation software application 220 being locally stored in a memory (not shown) of the disk controller 150. The disk controller 150, in other words, may be a separate board, card, or other component of the information handling system 100. The disk controller 150 may thus have its own dedicated processor (again, not shown for simplicity) that executes the memory allocation software application 220. FIG. 4, though, illustrates the memory allocation software application 220 stored in the host memory 120, and the memory allocation software application 220 may be executed by either or both of the processors 102 and 104. FIG. 5 illustrates the memory allocation software application 220 stored in the solid-state drive 164 and executed by a peripheral processor 224. Indeed, the solid-state drive 164 may have its own on-board or internal disk controller 226 that interfaces with the host system 206 to allocate the portion of the host memory 120 dedicated to the buffer cache 210. Regardless, as FIG. 6 best illustrates, the memory allocation software application 220 may compare usage parameters 230 to entries in an electronic database 232. FIG. 6 illustrates the electronic database 232 as a table 234 that electronically maps, relates, or associates different sizes 222 of the buffer cache 210 to different usage parameters 230. Whenever the memory allocation software application 220 obtains or retrieves any one or more usage parameters 230, the memory allocation software application 220 may query the electronic database 232 and retrieve the corresponding entry or value representing the size 222 associated with the buffer cache 210. The memory allocation software application 220 may then instruct or cause the disk controller (illustrated as reference numeral 150 in FIGS. 1-4 and reference numeral 226 in FIG. 5) to dynamically configure the buffer cache 210 to the size 222 retrieved from the electronic database 232.

Figure 7:
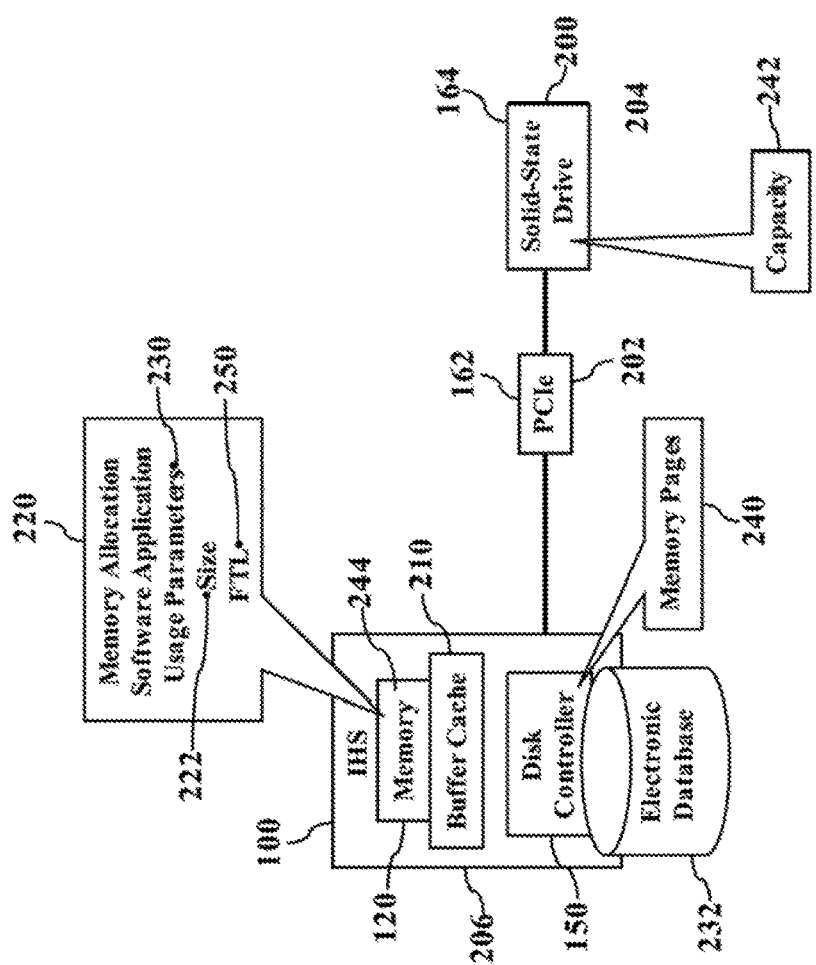
FIGS. 7-9 illustrate dynamic allocation of buffer cache, according to exemplary embodiments.
Figure 8:
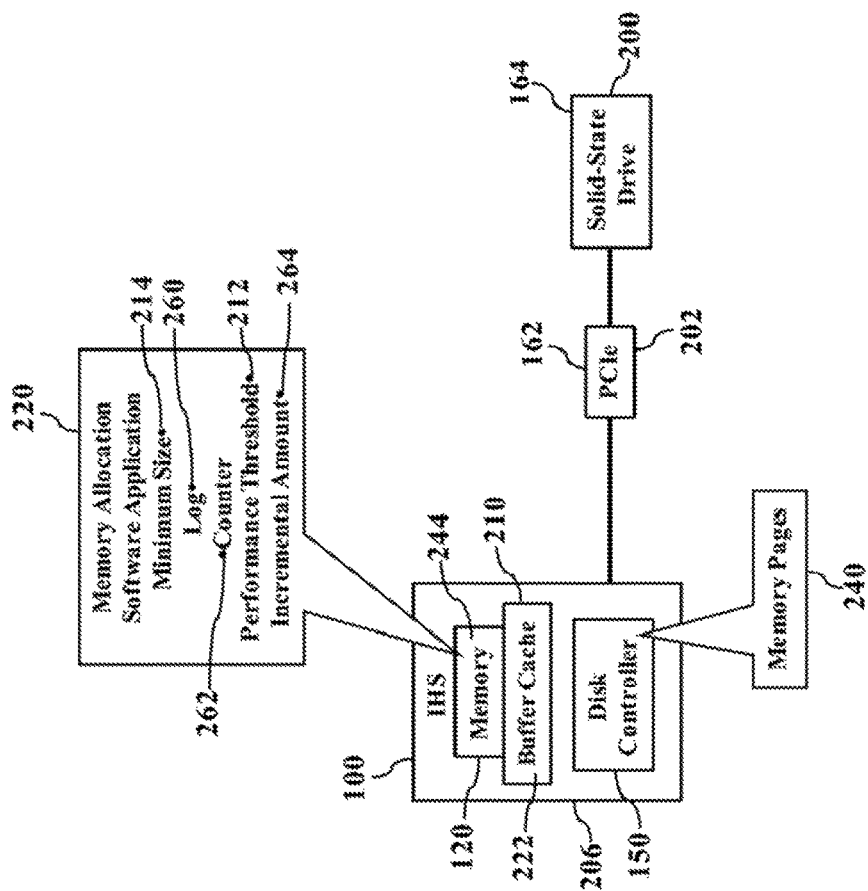
Figure 9:
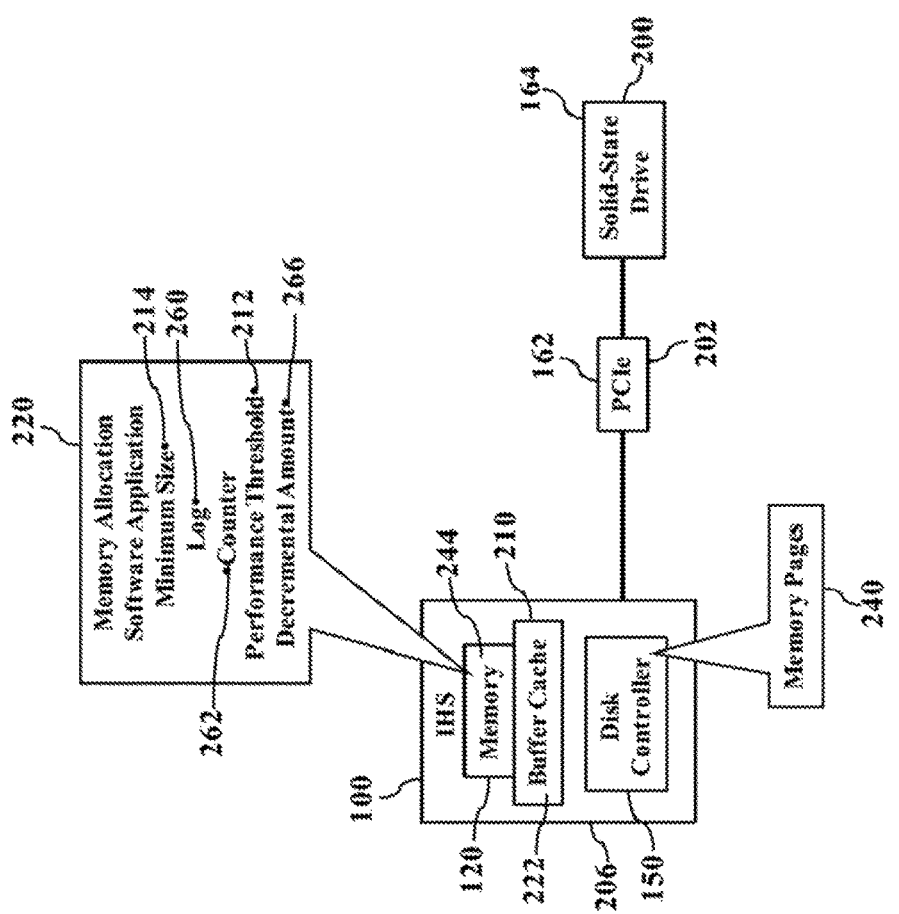

FIGS. 7-9 illustrate dynamic allocation of the buffer cache 210, according to exemplary embodiments. Here the buffer cache 210 may be sized according to a system configuration and memory pages 240. Suppose, for example, that the information handling system 100 is assembled or manufactured with the solid-state drive 164 having a capacity 242 of 256 GB. Furthermore, suppose the memory 120 includes 4 GB of system memory 244 (or RAM). The memory allocation software application 220 may thus treat or use the capacity 242 and the system memory 244 as initial values of the usage parameters 230. The memory allocation software application 220 may thus cause the disk controller 150 to query the electronic database 232 for either or both of the capacity 242 and the system memory 244 and retrieve the corresponding initial size 222 of the buffer cache 210.

The buffer cache 210 may thus be initially configured to store a flash translation layer (FTL) 250. The FTL 250 is a known software component that maps logical blocks to physical pages. Because the FTL 250 is known, a detailed explanation is unnecessary. Here, then, the memory allocation software application 220 may query for the initial size 222 of the buffer cache 210 that initially supports the FTL 250, based on the capacity 242 and the system memory 244. Suppose, for example, that the buffer cache 210 is initially configured or allocated with 16 MB of memory space, as electronically associated with the capacity 242 and the system memory 244. The initial size 222 of the buffer cache 210, in other words, may be preconfigured based on lab testing or performance characterization to determine the minimum size 214 of the system memory 244 allocated for the FTL 250.

FIG. 8 illustrates incremental reallocation of the buffer cache 210. Here the memory allocation software application 220 may instruct the disk controller 150 to increase or decrease the size 222 of the buffer cache 210, based on the memory pages 240 accessed by the solid-state drive 164. As the information handling system 100 operates, the disk controller 150 may read, write, and/or access different memory pages 240 representing blocks of data. Suppose, for example, the memory allocation software application 220 causes the disk controller 150 to maintain an electronic log 260 of the memory pages 240. The disk controller 150, in other words, tracks the memory pages 240 that are accessed from the solid-state drive 164. Some of the memory pages 240 may be unrecognized. That is, some of the memory pages 240 are different from others, perhaps as identified by a unique identifier. As the disk controller 150 accesses each different memory page 240, the disk controller 150 increments a counter 262. The counter 262 may have an initial value (such as zero). As the disk controller 150 reads, writes, and/or accesses each different memory page 240, the disk controller 150 increments the counter 262. The disk controller 150, in other words, counts the number of different memory pages 240 accessed to/from the solid-state drive 164. If the same memory page 240 is accessed, the counter 262 may or may not increment. Regardless, the memory allocation software application 220 causes the disk controller 150 to compare a current value of the counter 262 to the performance threshold 212. Here, then, the performance threshold 212 is configured as a threshold counter value for different memory pages 240 accessed by the solid-state drive 164. When the current value of the counter 262 equals or exceeds the performance threshold 212, the memory allocation software application 220 may determine that the buffer cache 210 should be increased in its size 222. For example, suppose the performance threshold 212 is ten (10). Whenever ten or more different memory pages 240 are accessed, exemplary embodiments may increment the buffer cache 210 by an incremental amount 264 (perhaps another 16 MB). The memory allocation software application 220, in other words, may instruct the disk controller 150 to allocate an additional predetermined incremental amount 264 to the system memory 244 that is dedicated to the buffer cache 210 (e.g., to 32 MB). Exemplary embodiments may thus dynamically increase the buffer cache 210 from the minimum size 214, based on the count of different memory pages 240 accessed via the solid-state drive 164.

FIG. 9 illustrates a reduction in the buffer cache 210. Here exemplary embodiments may reduce the size 222 of the system memory 244 allocated to the buffer cache 210, based on repetitive memory pages 240. That is, suppose the disk controller 150 additionally or alternatively counts the number of identical memory pages 240 accessed to/from the solid-state drive 164. The disk controller 150, in other words, monitors or tracks the memory page accesses that do not reference a new or different SSD page from to/from the solid-state drive 164. As each repetitive page 240 is accessed, the counter 262 may increment from its initial value to the current value. The memory allocation software application 220 causes the disk controller 150 to compare the current value of the counter 262 to the performance threshold 212. Here, though, the performance threshold 212 is configured to reduce the buffer cache 210. Suppose exemplary embodiments decrement the buffer cache 210 based on five (5) repetitive memory pages 240. That is, when the current value associated with the counter 262 equals or exceeds the performance threshold 212, the disk controller 150 reduces the size 222 of the buffer cache 210 according to a decremental amount 266 (such as 8 MB). So, when the disk controller 150 counts five (5) repetitive memory pages 240, then perhaps the system memory 244 allocated to the buffer cache 210 decrements 8 MB. Exemplary embodiments may even continue decrementing the buffer cache 210 down to the initial size 222 (perhaps as determined with reference to FIG. 6). Again, then, exemplary embodiments may dynamically allocate the buffer cache 210, based on the count of repetitive memory pages 240 accessed via the solid-state drive 164.

Exemplary embodiments may thus optimize the buffer cache 210. When the information handling system 100 is initially manufactured or configured, exemplary embodiments may allocate the initial size 222 of the buffer cache 210 for the FTL 250 (as explained with reference to FIG. 7). The minimum size 214, for example, may be 16 MB, based on the capacity 242 and the system memory 244. While the maximum size 216 may be established as desired, suppose the maximum size 216 is allocated at ¹⁄₁₀₀₀ of the capacity 242 of the solid-state drive 164 (or 256 MB for 256 GB). However, as the information handling system 100 operates over time, the count of new SSD memory pages may cause the buffer cache 210 to increase in predetermined increments of 16 MB, while the count of SSD memory pages that are not new may decrement the buffer cache 210 by predetermined decrements of 8 MB.

The counter 262 may reset. Continuing with the example, the buffer cache 210 is initialized in the system memory 244 at 16 MB (as explained with reference to FIG. 6). As the information handling system 100 operates (perhaps by session or by time), the disk controller 150 may quickly access the performance threshold 212 of ten (10) new memory pages 240, so the buffer cache 210 may quickly increment by 16 MB to a total allocation or value of 32 MB. The memory allocation software application 220 may then reset the counter 262 to its initial value (e.g., zero) and again begin counting the new or different SSD memory pages accessed via the solid-state drive 164. Should another ten (10) new SSD memory pages be accessed, the buffer cache 210 may increment another 16 MB to 48 MB.

However, historically repetitive or familiar usage may decrement the buffer cache 210. As the information handling system 100 operates over time, the same software applications are used and the same or similar data is accessed (especially during a continuous session or constant user). That is, the disk controller 150 observes or references repetitive or identical SSD memory pages 240 over time. The disk controller 150 may count these same SSD memory pages 240 and decrement the size 222 of the buffer cache 210 by 8 MB (such as from 48 MB to 40 MB). Exemplary embodiments may thus continually or periodically re-evaluate the counter 262 and reallocate the buffer cache 210 until a steady-state or equilibrium size 222 is determined over time. The size 222 of the buffer cache 210, in other words, will settle between an upper boundary and a lower boundary, based on repetitive usage (e.g., 24-48 MB in this example). Exemplary embodiments thus result in a highly optimized FTL buffer size in RAM, which leads to better performance and memory utilization.

Figure 10:
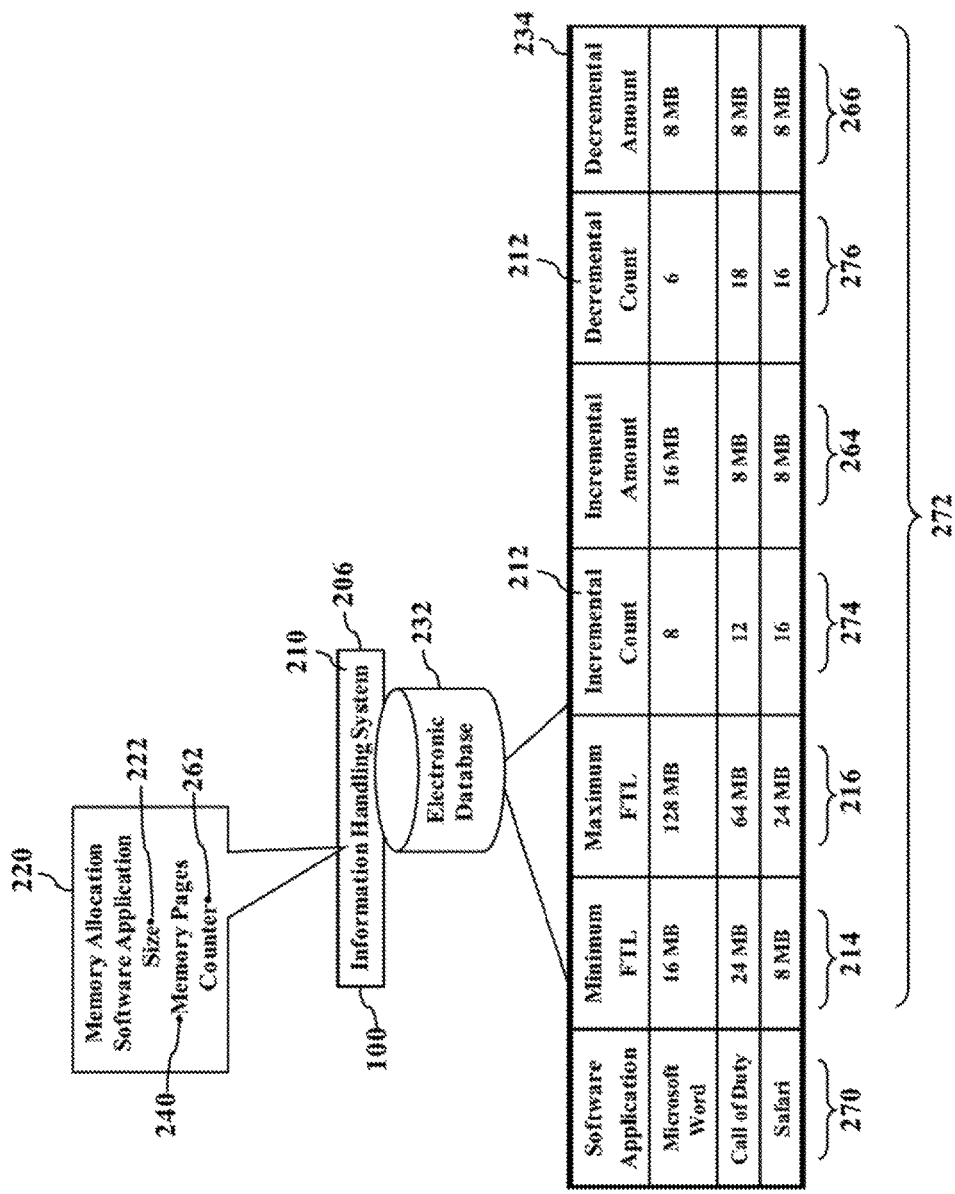
FIG. 10 illustrates dynamic allocation using software applications, according to exemplary embodiments.

FIG. 10 illustrates dynamic allocation using software applications, according to exemplary embodiments. Here exemplary embodiments may increment, or decrement, the size 222 of the buffer cache 210 based on execution or initiation of any software application 270. That is, when the information handling system 100 executes the software application 270, exemplary embodiments may query for caching parameters 272 that are predetermined for the software application 270. As FIG. 10 illustrates, the electronic database 232 may have entries that electrically associate different software applications 270 to their corresponding minimum size 214 and maximum size 216 of the buffer cache 210 hosted by the information handling system 100. The electronic database 232 may also have entries that electrically associate each software application 270 to its corresponding predetermined incremental amount 264 for increasing the size 222 of the buffer cache 210 and to its corresponding predetermined decremental amount 266 for decreasing the size 222 of the buffer cache 210. Moreover, other entries may define the performance thresholds 212 associated with the counter 262. For example, one of the performance thresholds 212 may be associated with an incremental count 274 when incrementing the buffer cache 210. The current value of the counter 262, in other words, may be compared to the incremental count 274 to determine increasing the buffer cache 210 (as this disclosure explains). Likewise, another one of the performance thresholds 212 may be a decremental count 276. That is, the current value of the counter 262 may be compared to the decremental count 276 to determine decreasing the buffer cache 210 (as this disclosure also explains).

Each software application 270 may thus have its own caching parameters 272. Suppose, for example, the information handling system 100 calls or executes MICROSOFT® WORD®. The memory allocation software application 220 may query the electronic database 232 for some unique identifier associated with the MICROSOFT® WORD® software application 270 and retrieve the corresponding minimum size 214, maximum size 216, incremental amount 264, decremental amount 266, incremental count 274, and decremental count 276 that are associated with the buffer cache 210. Exemplary embodiments may then dynamically allocate the buffer cache 210 according to the caching parameters 272 that are electronically associated with the MICROSOFT® WORD® software application 270. Similarly, if the information handling system 100 calls or executes the CALL OF DUTY® software application 270, exemplary embodiments may retrieve its corresponding caching parameters 272 and dynamically allocate the buffer cache 210.

The caching parameters 272 may thus be predefined. For example, laboratory or validation testing may reveal the caching parameters 272 that perform best for each different software application 270. As the reader likely understands, though, there can be millions of different software applications 270, so a complete definition for all possible software applications would be too cumbersome and impractical. In actual practice, then, the electronic database 232 may only contain a listing of common or high-value software applications. Moreover, default values for the caching parameters 272 may be defined for software applications not found in the electronic database 232. A user may also manually override any of the caching parameters 272 defined in the electronic database 232, thus allowing the user to input customized caching parameters 272 to suit personal performance goals and objectives.

Figure 11:
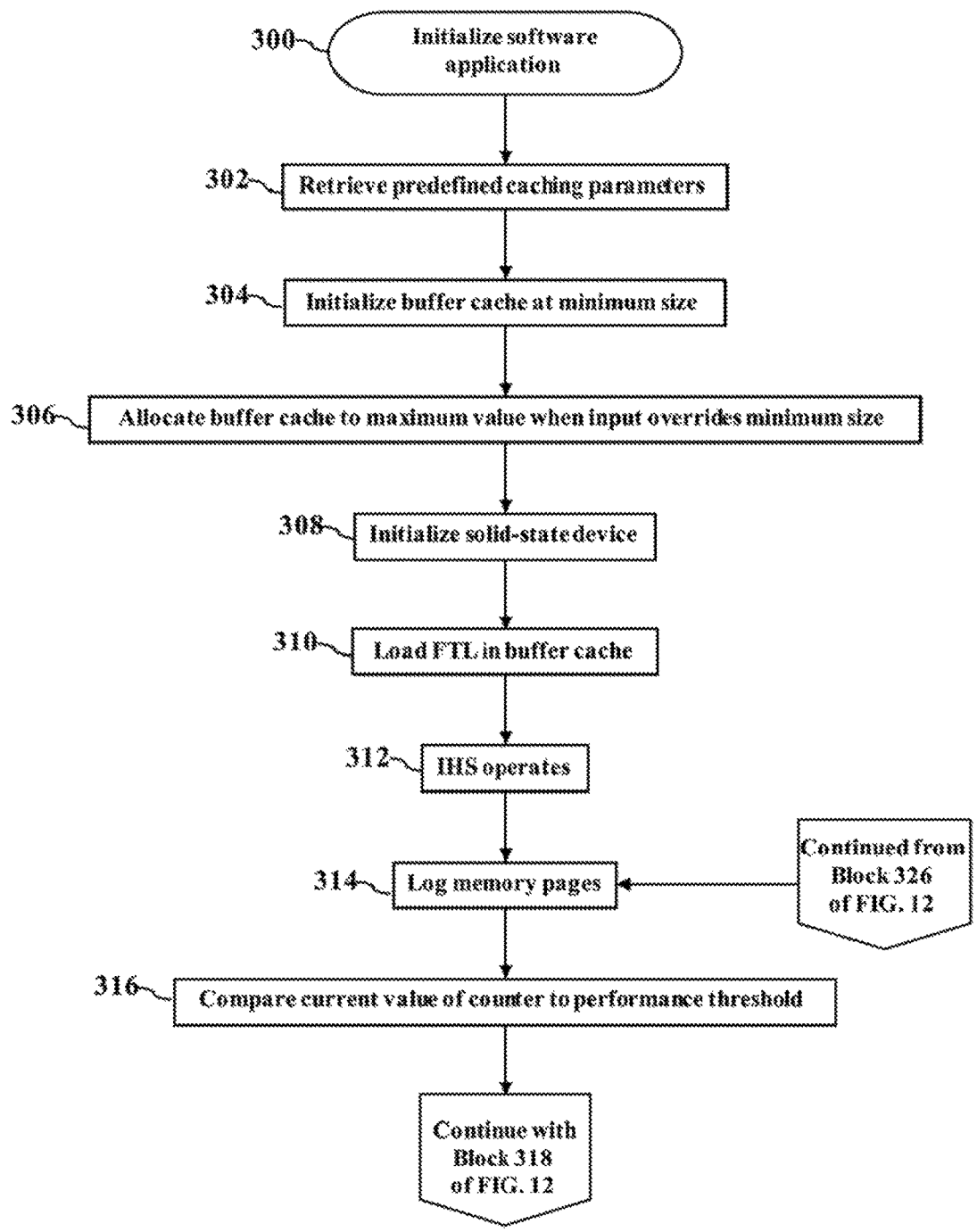
FIGS. 11-13 are flowcharts illustrating a method or algorithm for dynamically adjusting host memory buffer, according to exemplary embodiments.
Figure 12:
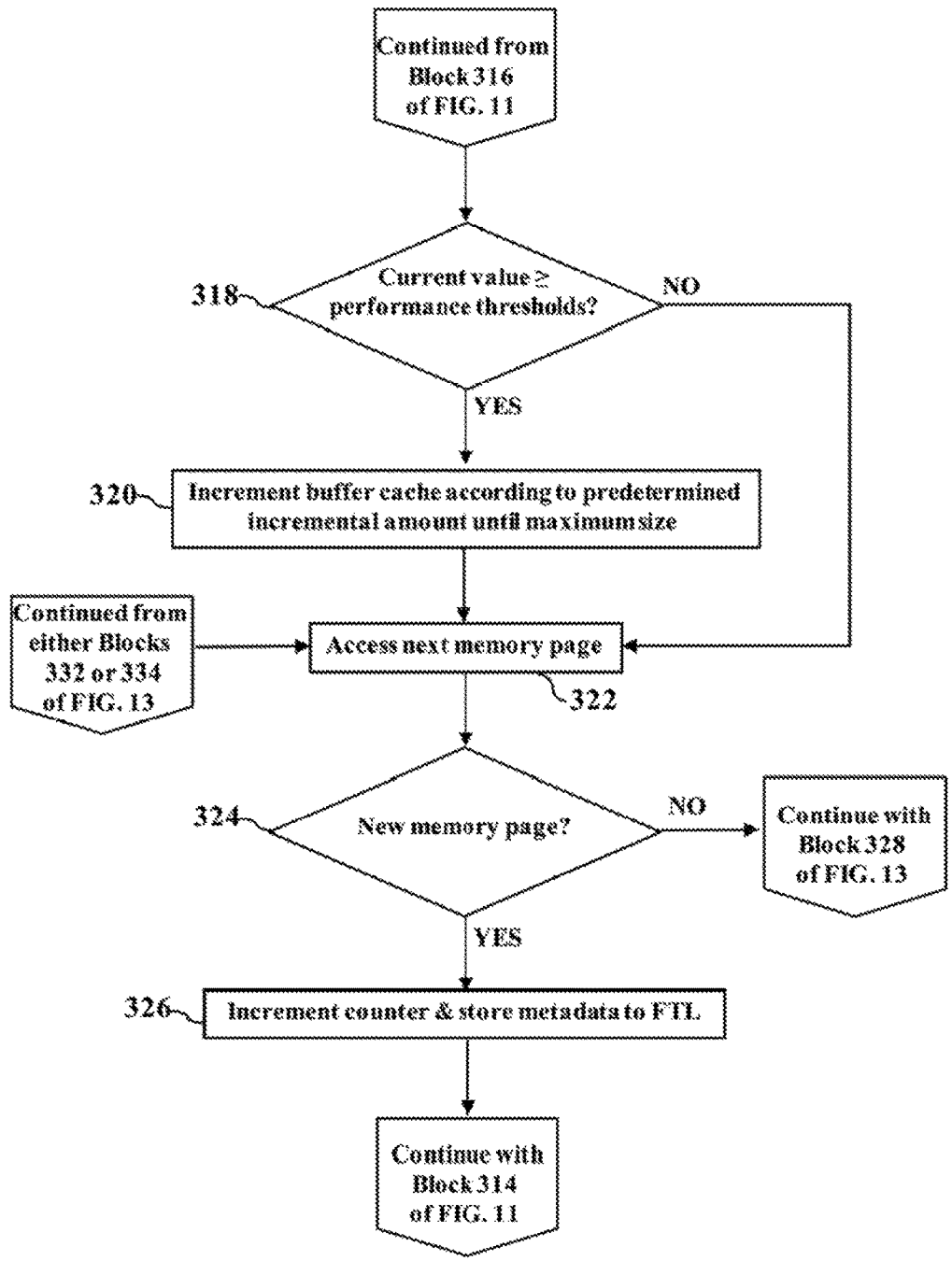
Figure 13:
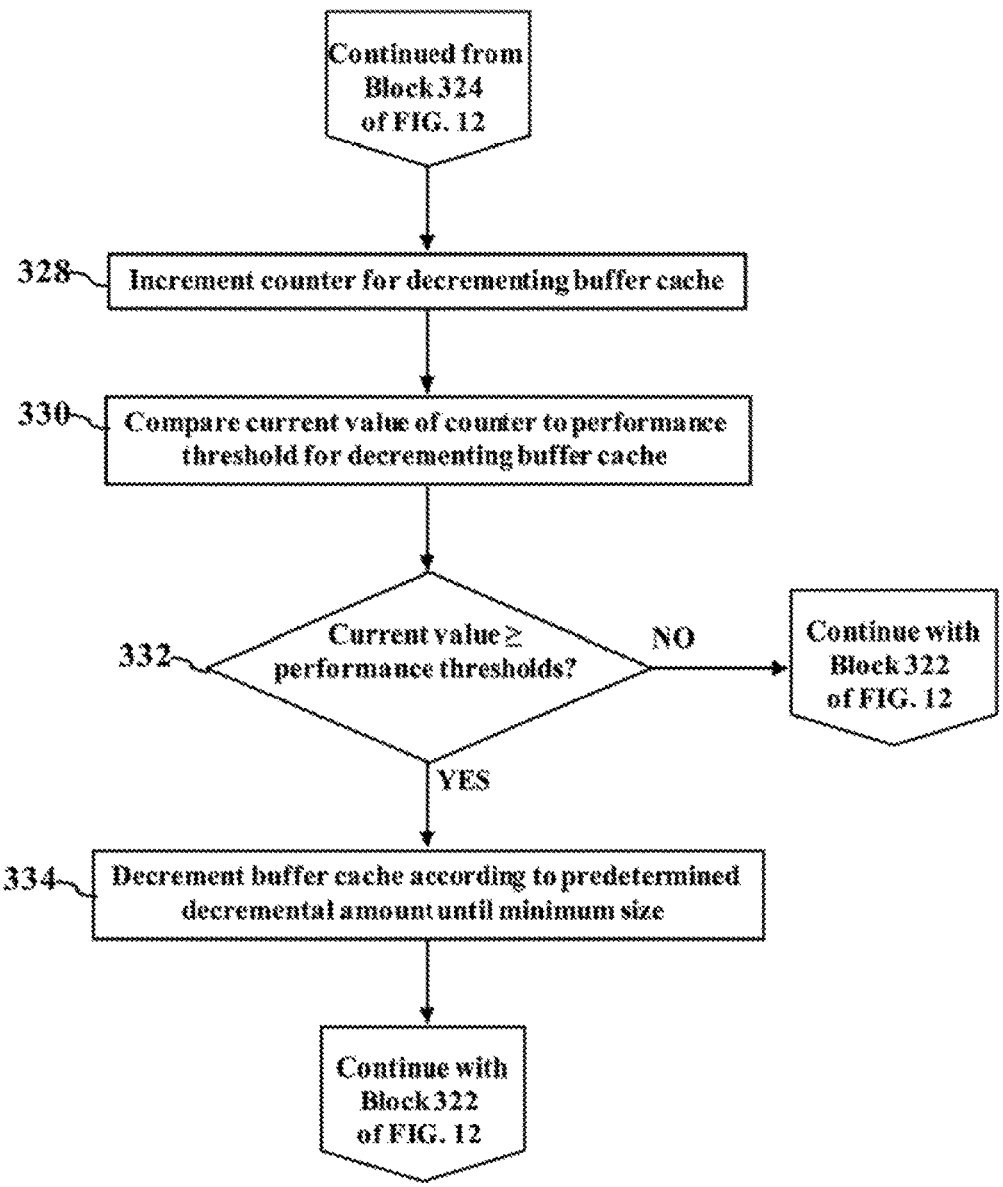

FIGS. 11-13 are flowcharts illustrating a method or algorithm for dynamically adjusting host memory buffer, according to exemplary embodiments. The software application 270 is initialized (Block 300) and the predefined caching parameters 272 are retrieved (Block 302). The buffer cache 210 is initialized at the minimum size 214 (Block 304). If an input overrides the minimum size 214, then the buffer cache 210 is allocated to the maximum size 216 (Block 306). The solid-state drive 164 is initialized according to the size 222 of the buffer cache 210 (Block 308) and the FTL 250 is loaded to the buffer cache 210 (Block 310). As the information handling system 100 operates (Block 312), the memory pages 240 are logged according to frequency or count (Block 314). The current value of the counter 262 is compared to the performance thresholds 212 (e.g., the incremental count 274 for incrementing the buffer cache 210) (Block 316).

The flowchart continues with FIG. 12. If the current value of the counter 262 equals or exceeds the performance thresholds 212 (Block 318), then the size 222 of the buffer cache 210 is incremented according to the predetermined incremental amount 264 (Block 320) and a next memory page 240 is accessed (Block 322). If the next memory page 240 is new or different (Block 324), then the counter 262 is incremented and page metadata is stored to the FTL 250 (Block 326). The flowchart then returns to Block 314 of FIG. 11 to continuing logging the memory pages 240.

The flowchart continues with FIG. 13. If the next memory page 240 is not new (e.g., Block 324 of FIG. 12), then the next memory page 240 has been previously logged and/or determined to be repetitive. The counter 262 for decrementing the buffer cache 210 is incremented (Block 328), as a processing cycle is tracked without buffer access. The current value of the counter 262 is compared to the performance thresholds 212 (e.g., the decremental count 276 for incrementing the buffer cache 210) (Block 330). If the current value of the counter 262 equals or exceeds the performance thresholds 212 (Block 332), then the size 222 of the buffer cache 210 is decremented according to the predetermined decremental amount 266 (Block 334). The flowchart then accesses another memory page 240 (Block 322 of FIG. 12) to continue dynamically adjusting the buffer cache 210.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for optimizing a buffer cache in a system memory of a host system, comprising:

determining, by a disk controller, a capacity associated with a solid state memory drive, the solid state memory drive accessible to the disk controller as a peripheral device via an interface;

determining, by the disk controller, the system memory available from the host system;

determining, by the disk controller, a count of memory pages in the system memory accessed via the solid state memory drive; and dynamically allocating, by the disk controller, a portion of the system memory as the buffer cache based on a performance threshold associated with the solid state memory drive, the buffer cache storing a flash translation layer file associated with the solid state memory drive, the buffer cache dynamically allocated based on the count of the memory pages accessed via the solid state memory drive by comparing the count of the memory pages to the performance threshold;

wherein if the count of the memory pages equals or exceeds the performance threshold, then increasing a size of the buffer cache; and wherein if the count of the memory pages is less than the performance threshold, then decreasing the size of the buffer cache.

2. The method of claim 1, further comprising configuring an initial value of the size of the buffer cache based on the capacity associated with the solid state memory drive.

3. The method of claim 1, further comprising configuring an initial value of the size of the buffer cache based on the system memory available from the host system.

4. The method of claim 1, further comprising determining the count of different ones of the memory pages accessed via the solid state memory drive.

5. The method of claim 1, further comprising determining the count of repetitive ones of the memory pages accessed via the solid state memory drive.

6. An information handling system, comprising:
a processor; and
a memory device accessible to the processor, the memory device storing instructions that when executed cause the processor to perform operations including:
determining a capacity associated with a solid state memory drive, the solid state memory drive accessible to the processor as a peripheral device via an interface;
determining a count of memory pages in a system memory accessed via the solid state memory drive;
dynamically allocating a portion of the memory device as a buffer cache based on a performance threshold associated with the solid state memory drive, the buffer cache storing a flash translation layer file associated with the solid state memory drive, the buffer cache dynamically allocated based on the count of the memory pages accessed via the solid state memory drive;
comparing the count of the memory pages to the performance threshold;
increasing a size of the buffer cache in response to the count of the memory pages equaling or exceeding the performance threshold; and
decreasing the size of the buffer cache in response to the count of the memory pages less than the performance threshold.

7. The system of claim 6, wherein the operations further comprise configuring an initial value of the size of the buffer cache based on the capacity associated with the solid state memory drive.

8. The system of claim 6, wherein the operations further comprise configuring an initial value of the size of the buffer cache based on a system memory.

9. The system of claim 6, wherein the operations further comprise determining the count of different ones of the memory pages accessed via the solid state memory drive.

10. The system of claim 6, wherein the operations further comprise determining the count of repetitive ones of the memory pages accessed via the solid state memory drive.

11. A memory device storing instructions that when executed cause a processor to perform operations, the operations comprising:
determining a capacity associated with a solid state memory drive, the solid state memory drive accessible to the processor as a peripheral device via an interface;
determining a count of memory pages in a system memory accessed via the solid state memory drive;
dynamically allocating a portion of the memory device as a buffer cache based on a performance threshold associated with the solid state memory drive, the buffer cache storing a flash translation layer file associated with the solid state memory drive, the buffer cache dynamically allocated based on the count of the memory pages accessed via the solid state memory drive;
comparing the count of the memory pages to the performance threshold;
increasing a size of the buffer cache in response to the count of the memory pages equaling or exceeding the performance threshold; and
decreasing the size of the buffer cache in response to the count of the memory pages less than the performance threshold.

12. The memory device of claim 11, wherein the operations further comprise configuring an initial value of the size of the buffer cache based on the capacity associated with the solid state memory drive.

13. The memory device of claim 11, wherein the operations further comprise configuring an initial value of the size of the buffer cache based on a system memory.

14. The memory device of claim 11, wherein the operations further comprise determining the count of different ones of the memory pages accessed via the solid state memory drive.

* * * * *